Jan. 2, 1968  E. J. STRANG ETAL  3,361,408
VEHICLE JACK
Filed Sept. 27, 1966  3 Sheets-Sheet 3
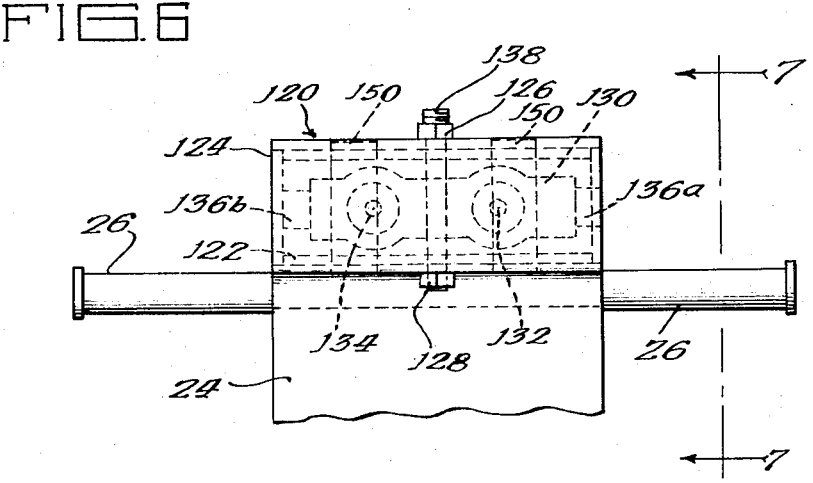
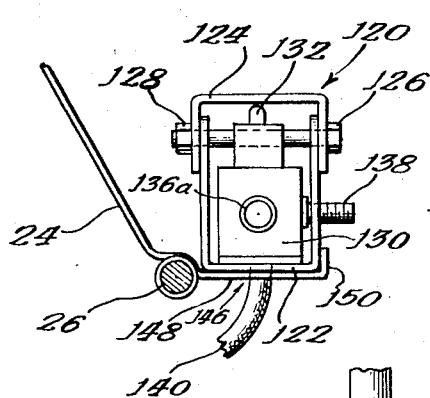
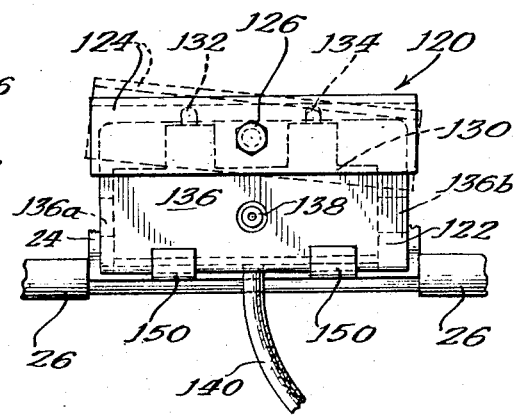
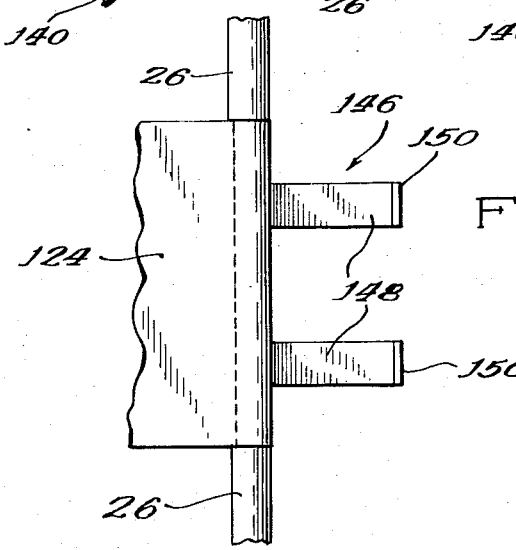

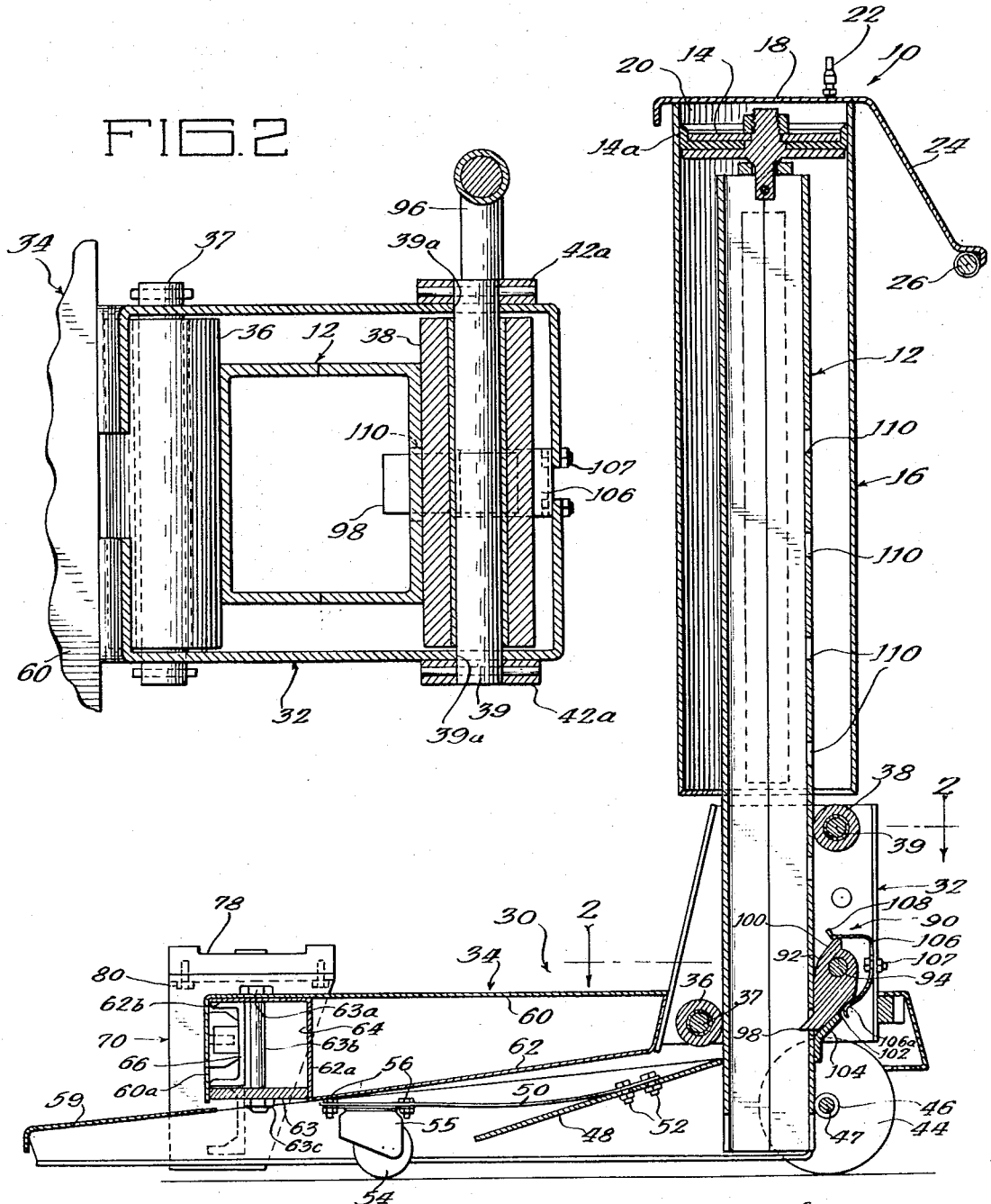

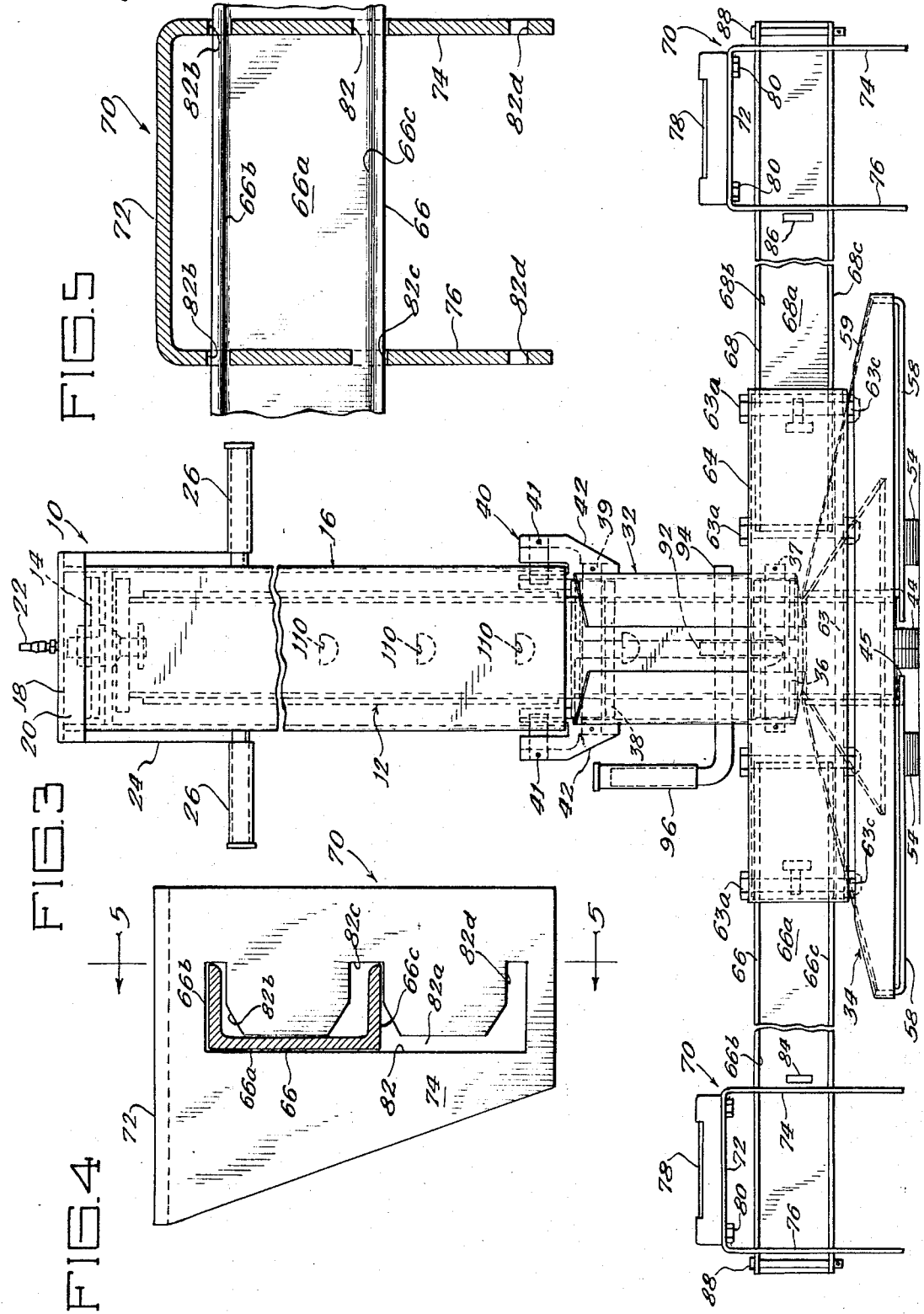

United States Patent Office 3,361,408
Patented Jan. 2, 1968

3,361,408
VEHICLE JACK
Elmer J. Strang and Billy L. Sorenson, Fort Dodge, Iowa, assignors to The Coats Company, Inc., a corporation of Iowa
Filed Sept. 27, 1966, Ser. No. 582,364
6 Claims. (Cl. 254—2)

ABSTRACT OF THE DISCLOSURE

An automobile jack of the type having an upright member and a column telescoped over the upright member for vertical movement with respect thereto, the upright member having locking surfaces and a locking pawl being pivoted to the column and normally urged into locking engagement with the locking surfaces of the upright member, characterized in that spring means is provided on the column for normally urging the pawl into locking position, the spring means having surfaces cooperable with surfaces on the pawl for holding the same in a retracted position. Also, the column supports and bears lifting arms for raising a vehicle and adjustable pads are provided for the lifting arms, the pads having multiple vertically oriented surfaces mating with the arms for mounting the pads in different positions of vertical orientation with respect to the arms. The upper end of the jack is provided with a bracket for receiving a valve connectable with fluid means for raising and lowering the column.

---

This invention relates to an apparatus for raising one of the front or rear end of an automobile and more particularly to an improvement in fluid operated jack devices.

This invention is directed, in brief, to an improvement in the locking mechanism for maintaining the jack at predetermined levels of extension and further to an improvement in the lift portions of the jack which directly engage and support a vehicle in the lifting function of the jack.

A primary object of this invention is to provide an improved jack device for vehicles.

Another object of this invention is to provide an improved locking device for a vehicle jack.

A further object of this invention is to provide an improved locking arrangement for a vehicle jack wherein the lock is normally biased towards locking position during extension of the jack and is held in retracted position during descent of the jack, the jack being provided with means for automatically tripping the lock to the locking position upon completion of the descent of the jack.

Yet another object of this invention is to provide an improved adjustable lifting pad assembly for a vehicle jack.

A further object of this invention is to provide an improved lifting pad assembly for a vehicle jack which is provided with a plurality of vertically oriented apertures generally mating with the cross-sectional configuration of the lifting arms so that the initial vertical orientation of the lifting pads may be easily and quickly adjusted.

A further object of this invention is to provide an improved vehicle jack wherein the lifting arms comprise a pair of opposed, slidably mounted, channel-like members and the lifting pads are provided with vertically oriented slots which mate with the configuration of the lifting arms to provide a means for adjusting the initial height of the lifting pads relative to the litfing arms.

Other objects, features and advantages of the present invention will be apparent from the following description of the preferred embodiments illustrated in the accompanying drawings, in which:

FIGURE 1 is a vertical section view of a jack device embodying the features of this invention;

FIGURE 2 is a fragmentary enlarged sectional view taken generally along the line 2—2 of FIGURE 1;

FIGURE 3 is an end elevational view, partially broken away in section, of the jack device shown in FIGURE 1;

FIGURE 4 is a side elevational view of the novel lifting pads utilized with the jack device of this invention;

FIGURE 5 is a section view taken generally along the line 5—5 of FIGURE 4;

FIGURE 6 is a fragmentary top plan view of a portion of a modified form of the handle structure for the jack of this invention and showing a hand operated control valve which may be used to control the elevation and descent of the jack;

FIGURE 7 is a fragmentary section view taken generally along the line 7—7 of FIGURE 6;

FIGURE 8 is a fragmentary elevational view of a portion of the modified handle structure of the jack of this invention illustrating generally in side elevation a valve assembly for use with the jack; and FIGURE 9 is a fragmentary top plan view similar to FIGURE 6 with the valve assembly removed from the bracket structure on the rear of the handle.

The jack device 10 includes an upright post 12 which is a substantially box-like column of heavy metal. A piston 14 is secured to the upper end of post 12 and is provided with suitable peripheral sealing means 14a intended to be in intimate sealing engagement with the inner walls of cylinder 16 which is telescoped over post 12. Preferably cylinder 16 is a generally circular cylindrical member of heavy metal.

A cap 18 covers the top of cylinder 16 leaving a space 20 between the cap 18 and the piston 14. Fitting 22 is provided in cap 18 to provide a means for admitting fluid under pressure to the space 20. Preferably this fluid would take the form of compressed air which is normally available in service stations. With the admission of fluid to the space 20, cylinder 16 extends upwardly relative to post 12. Cap 18 has a generally downwardly extending trailing portion 24 which supports a pair of handles 26 at its lowermost end.

Cylinder 16 is connected to a base portion 30 which includes a neck portion 32 and a forward portion 34. Neck portion 32 also has a hollow, box-like configuration and is generally trapezoidal in side elevation as best seen in FIGURE 1.

Guiding means are provided in neck portion 32 including lower guide roller 36 and upper guide roller 38. These guide rollers are mounted on axles 37 and 39, respectively, which extend through openings in the side walls of the neck portion 32, such as openings 39a shown in FIGURE 2. The rollers are so mounted that their peripheries track on opposite faces of the post 12. In addition, the rollers are vertically offset as best seen in FIGURE 1 and this, in combination with the facial engagement with the opposite faces of the post 12, stabilizes the movement of neck 32 relative to post 12 during extension and retraction of cylinder 16.

Cylinder 16 and neck 32 are connected together by bracket means 40 to provide an operatively continuous column. Included in bracket means 40 are a pair of stubs 41 which extend through the side walls of cylinder 16 and are mounted in each bracket element 42 which extends between the lower portion of cylinder 16 and the upper portion of neck 32, generally diametrically opposite from each other. The lower end of each bracket element 42 receives one end of axle 39 which extends beyond each opening 39a. In this fashion the cylinder 16 is connected to the base 30 for vertical extension and retraction of the two as a unit when air is admitted and released from space 20.

Means are provided for holding the jack elevated from a supporting surface and permitting the jack to be easily traversed about its supporting surface. Included in this means are two rear rollers 44 at the lower end of post 12. A sleeve 46 is secured, such as by welding, to the lower end of post 12 to receive roller shaft 47 which extends through the sleeve to rotatably mount rollers 44 to the lower end of post 12.

A plate 48 is secured to the lower end of the forward face of post 12 and supports a yieldable sheet 50 of spring metal or the like which is secured to plate 48 by suitable fasteners 52. The forward end of sheet 50 supports a pair of laterally spaced, forward rollers 54 rotatably mounted in a roller truck 55 secured to sheet 50 by suitable fasteners 56. Normally the sheet 50 is of sufficient strength so that it may support the weight of the jack. However, when the jack is utilized to lift a vehicle, sheet 50 yields so that roller 54 retracts relative to the jack, thereby permitting forward portions of the jack 34 to engage the supporting surface on which the jack rests. In this fashion, the jack will be sufficiently held against rolling while performing its lifting function.

A pair of arms 58 extend generally diagonally outwardly from opposite sides of the bottom of post 12. These arms preferably are formed of a heavy metal and may be secured to the column 12 such as by welding or the like. A generally decorative shroud structure 59 is connected to and covers the forward ends of the arms 58 as shown in FIGURES 1 and 3.

Means are provided on the jack for housing the jack lifting arms. Included in this means is a plate member 60 which extends generally horizontally forwardly from neck 32 and has a downturned portion 60a at its extreme end. A second member 62 extends forwardly and downwardly at a slight angle relative to member 60 and has a forward portion including a first upturned portion 62a which terminates in a second forwardly turned portion 62b in facial engagement with the member 60, terminating at end portion 60a. Portions 60a and 62a are generally parallel to each other.

A supporting base 63 is interposed between portions 60a and 62a, vertically spaced from portion 62b and secured by suitable means, such as welding. Suitable fastening means, such as a plurality of bolts 63a, extend through aligned openings (not shown) in the forward portion of plate 60 and in portion 62b as well as through openings (not shown) in base member 63. The shank 63b of each bolt 63a generally bisects the cavity 64 formed by portions 60a, 62b and base 63. A nut 63c is threaded to the end of each bolt 63a.

Cavity 64 extends across the front of the jack well forwardly of the lifting column defined by cylinder 16 and neck 32 and provides a means for slidably supporting lifting arms 66 and 68. Each arm 66 and 68 is preferably made of heavy, channel bar steel, having a generally C-shaped configuration in cross section, including a base 66a and 68a, respectively, and generally opposite, parallel, outwardly extending flanges 66b, 66c, and 68b, 68c, respectively.

The cavity 64 is of such a dimension that with the bolt 63a extending through the middle of the cavity, the cavity is bisected into two subcavities, each generally of a size to receive one of the lifting arms 66 or 68 generally in a back-to-back relationship so that the base portions 66a and 68a generally oppose each other and abut a portion of the shank 63b of each bolt 63a. In this fashion, the arms 66 and 68 are mounted in the cavity 64 for lateral extension relative to the cavity and to the jack.

When the jack is not in use, the arms may be telescoped inwardly of the cavity and generally retracted so as to reduce the lateral dimension of the jack. However, when the jack is set up for use, the arms are extended from the cavity to give sufficient lateral extension to the jack so that suitable portions of the underside of a vehicle may be engaged by the lifting arms. Minor adjustments in the desired lateral extension of the arms may be easily made due to their slidable mounting relative to the cavity 64.

Each end of each lifting arm is provided with lifting pads 70, each of which is a member of heavy metal bent upon itself into a substantially U-shaped configuration as shown in FIGURES 3 and 5 to form a central or top portion 72 and two spaced parallel legs 74 and 76. A substantially thickened plate or pad 78 is secured to portion 72 by fasteners 80 to strengthen the structure. It is intended that the plate 78 will engage suitable structure on the underside of an automobile, such as portions of the frame or axle, during the lifting operation of the jack.

Each leg 74 and 76 of lifting pad 70 is provided with a generally E-shaped lifting arm receiving slot 82. Slot 82 includes an elongate upright portion 82a and three outwardly projecting portions 82b, 82c and 82d. The distance between portions 82b and 82c as well as between 82c and 82d are substantially the same as the distance between the flanges 66b and 66c or 68b and 68c of the lifting arms 66 and 68, respectively. The frame and axles of different vehicles ranging from small foreign cars and low slung sport type vehicles to larger cars and light trucks have different ground clearances. Furthermore, the larger vehicles tend to have larger wheels. It is desirable that the lifting mechanism be capable of adjustment so as to be able to be inserted under the lowermost oriented vehicle as well as under the highest slung vehicle and still be capable of raising each different vehicle to height necessary to fully elevate the vehicle from a supporting surface.

To this end, the lifting pad 70 may be mounted on the lifting arms in the upper portion of the notch with portions 66a and 68a of the arms occupying portion 82a of the notch and flanges 66b and 66c or 68b and 68c, respectively, occupying portions 82b and 82c of the notch. However, if it is desired that plate 78 be spaced a greater distance above each of the lifting arms, the lifting pads may be mounted on the arms with flanges 66b, 66c and 68b, 68c occupying notches 82c and 82d. Thus the lifting pads are provided with a means for easily adjusting the height of the vehicle engaging surface between a lowermost and uppermost position.

Each lifting arm 66 and 68 is provided with a stop element 84 and 86, respectively, which limits the extent of the axial insertion of the lifting arm through the notches in the lifting pad. Once the lifting pad has been telescoped over the lifting arm, a pin 88 may be telescoped through openings in the extreme outer ends of the flanges 66b and 66c or 68b and 68c of the lifting arms to thereby position the lifting pads on the arms against substantial lateral deviation relative to the arms and to prevent inadvertent withdrawal of the pads from the arms.

A locking means 90 is provided for locking the jack in selected positions of extended adjustment thereby preventing accidental and unintended descent of the jack should the fluid under pressure normally occupying the space 20 be inadvertently or accidentally expelled therefrom. Included in the locking means 90 is a pawl 92 which is fixed on a rod 94 extending through the opposite side walls of neck 32. One end of rod 94 is bent upwardly into a handle portion 96 so that movement of the handle portion will rotate the rod and thereby rotate the pawl accordingly. The pawl 92 has a forwardly projecting finger or locking surface 98 which projects outwardly from the lower end of the front face of the pawl. The top of the pawl is provided with an upwardly extending knob 100 and the lower end of the pawl has a generally flat surface 102 extending diagonally upwardly from the finger portion 98. When the jack is in the at rest position as shown in FIGURE 1, surface 102 abuts a stop member 104 mounted on the lower end of post 12.

A generally C-shaped spring 106 is secured to the interior of neck 32 by fastening means 107. The lower portion of the spring has a curved extremity 106a which bears against pawl 92 normally urging the pawl toward the post 12. The upper portion of the spring extends generally transversely outwardly from the interior of neck 32 and has a bent free end 108 forming a detent which abuts the knob portion 100 of member 92.

The post is provided with a plurality of notches or latching means 110 of a size and shape to receive the finger portion 98 of member 92. In the at rest position, the finger 98 occupies the lowermost notch 110. When it is desired to elevate the jack, a source of fluid under pressure is connected to the inlet 22 and fluid under pressure is admitted to the chamber 20, causing the cylinder 16 and the associated base structure 30 to rise relative to post 12. As the extension of cylinder 16 is initiated, the upward movement will cause the finger to be kicked outwardly from the lowermost notch.

When the jack is raised to the desired elevation, fluid is evacuated from chamber 20 until the finger 98 of pawl 92 "finds" the next lowermost notch 110 in upright member 12. The curved extremity 106a of the spring 106 will automatically urge the finger 98 into the notch to positively lock the column against unintended descent relative to the upright member 12.

To permit the retraction of the jack, it is necessary that the locking element be moved to a retracted position. For this purpose, handle 96 is utilized to retract finger 98 from one of the notches 110 and swing the pawl so that knob 100 moves to the outside or to the left of free end 108 of spring 106 as viewed in FIGURE 1. In this manner, the pawl is positively held in a retracted position permitting the relative retraction or descent of the column structure relative to the upright member when the fluid under pressure is released from chamber 20.

However, when the jack reaches its lowermost point or "bottoms," the surface 104 engages the underside 102 of the lock element and automatically releases the lock element from the retracted position and thereby preconditions it for engagement with the notches of the post during the next relative extension of the cylinder.

A valve assembly 120 is provided for controlling the input and outlet of air from chamber 20. The valve assembly includes a generally channel or U-shaped elongated base member 122 and an elongated channel-like or U-shaped cover 124 which is slightly wider than the base so that the cover fits over the base. The cover is swingably secured relative to the base by means of a bolt 126 which extends through the cover and base to secure the two together for rocking action relative to each other with the aid of nut 128 which is threaded onto the end of the bolt.

A valve 130 is fixed in the interior of housing portion 122 and includes an inlet spindle 132 and an outlet spindle 134 both of which closely abut the inside cover 124. When the cover is rocked to one side or the other about bolt 126, one of the spindles 132 or 134 will be depressed to initiate an intake or exhaust action. Ends 136a and 136b of the valve 130 are provided with a fitting for receiving an air hose from a source of air under pressure. In addition, a conventional tire valve 138 extends outwardly from the sides of the housing so that, if desired, the conventional air inflation hose may be utilized to supply air under pressure to the valve. Air hose 140 leads from the valve for connection to the fitting 22 so that when the cover 124 is rocked from side to side, air may be admitted into, or exhausted from, chamber 20, depending upon the movement of the cover. When the cover is in a center position, the valve is in a "neutral" position wherein air is neither admitted into, nor exhausted from, the chamber 20.

The jack is provided with a means for conveniently storing the valve 120 on the jack. Preferably, this takes the form of a bracket 146 secured to the rear of the trailing portion 24 between the handles 26. Bracket means 146 includes a pair of spaced rearward extending fingers 148 terminating in upturned free ends 150. When the valve 120 is not in use, it may be placed upon the fingers 148 and partially embraced by the upturned ends 150 with air hose 140 extending downwardly between the two fingers 148. It is intended that the length of hose 140 between fitting 22 and the valve assembly 120 would be sufficient to permit a jack operator to stand a small distance away and control the operation of the jack from a relatively remote position, if desired.

The jack disclosed herein is provided with locking mechanism which will be automatically preconditioned for locking engagement with the post portion of the jack as a result of movement of the jack to the fully retracted position. Such automatic preconditioning precludes the possibility of the jack failing to lock in an extended position due to operator error. In addition, the lifting pad structure of the jack is provided with a simplified and easily manipulated height adjustment to accommodate vehicles of different configurations and further to be ideally adjusted for lifting vehicles having deflated or inflated tires.

The foregoing detailed description has been given for clearness of understanding only, and no unnecessary limitations should be understood therefrom, as some modifications may be obvious to those skilled in the art.

We claim:

1. A jack device for elevating a vehicle and holding the same in an elevated position, comprising: an upright member having a plurality of spaced latching surfaces thereon; a lift column positioned over said upright member for movement between different positions of extended adjustment relative to said upright member; vehicle lifting arms connected to said lift column in a position to engage the underside of a vehicle at points spaced from the column to lift and support a vehicle as said lift column is extended relative to said upright member; releasable means for moving said column to said positions of extended adjustment; locking means on said lift column having a locking surface adapted for engagement with said latching surfaces of said upright member for locking said column in said positions of extended adjustment, said locking means including a pawl swingably mounted to said lift column for movement between a locking position wherein said locking surface engages the latching surface, and a retracted position; means normally urging said locking means towards the locking position including spring means on the column adjacent the pawl having portions normally biasing the pawl towards the latching surfaces of the upright member, the pawl and spring also having cooperating surfaces for holding the pawl in the retracted position in opposition to the normal spring force urging the pawl into the locking position to permit retraction of the column relative to the upright member; and means responsive to retraction of the column for releasing the means holding the locking means in the retracted position to thereby precondition the locking means for engagement with the latching surfaces of the upright member during the next relative extension of the column.

2. The jack device of claim 1 wherein the pawl is mounted on a shaft which extends outwardly of the column, movement of the shaft permitting movement of the pawl from its locking position in engagement with the upright member to the retracted position permitting movement of the column relative to the upright member.

3. The jack device of claim 2 wherein the means for preconditioning the pawl includes a stop member on the upright member positioned to engage the pawl at the bottom of the descent of the column and thereby trip the pawl out of its retracted position.

4. A jack device for lifting a vehicle and holding the same in an elevated position, comprising: an upright member; a lift column positioned over said upright member for movement between different positions of extended adjustment relative to said upright member and defining a fluid chamber therebetween; vehicle lifting arms connected to said lift column in a position to engage the underside of a vehicle at points spaced from the column to lift and support a vehicle as said column is extended relative to said upright member; means for supplying a source of fluid under pressure to said chamber including a valve member connected to said chamber by flexible conduit means, said valve member having means for connecting the same to a source of fluid under pressure so that actuation of the valve will cause the admission of fluid under pressure to said chamber, and bracket means on said column for storing the valve during periods of nonuse thereof, the flexible connection of the valve to the chamber permitting operation thereof from points spaced from the column.

5. The jack device of claim 4 wherein the valve member has a tire valve stem fitting thereon to permit the application of fluid under pressure to the chamber by engaging a conventional service station inflation hose with said tire valve stem.

6. A jack device for elevating a vehicle and holding the same in an elevated position, comprising: first and second members constructed and arranged for extension and retraction relative to each other, one of said members having means for engaging and traversing a supporting surface, the other of said members having housing means for supporting lifting arms forwardly of the first and second members; a plurality of lifting arms movably mounted in said housing means for movement between positions of extension and retraction relative to each other and relative to said first and second members, said lifting arms being generally C-shaped in cross section; an adjustable lifting pad for each lifting arm, each pad having a vehicle engaging portion and a lifting arm engaging portion, said lifting arm engaging portion comprising generally E-shaped slots in the lifting pad so that the pads may be mounted on the arms in different positions of vertical orientation with respect thereto.

References Cited

UNITED STATES PATENTS

| | | | |
|---|---|---|---|
| 2,805,839 | 9/1957 | Branick | 254—2 X |
| 2,868,501 | 1/1959 | Cloud et al. | 254—2 |
| 2,937,002 | 5/1960 | Schultz | 254—2 X |
| 2,947,513 | 8/1960 | Nalden et al. | 254—2 |
| 3,130,956 | 4/1964 | Mandelko | 254—2 |

FOREIGN PATENTS 564,118    9/1958    Canada.

MILTON S. MEHR, *Primary Examiner.*